United States Patent
Agarwal et al.

(10) Patent No.: US 7,533,090 B2
(45) Date of Patent: May 12, 2009

(54) SYSTEM AND METHOD FOR RATING ELECTRONIC DOCUMENTS

(75) Inventors: Sumit Agarwal, San Carlos, CA (US); Gokul Rajaram, Mountain View, CA (US); Leora Ruth Wiseman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 410 days.

(21) Appl. No.: 10/812,417

(22) Filed: Mar. 30, 2004

(65) Prior Publication Data

US 2005/0223002 A1 Oct. 6, 2005

(51) Int. Cl.
*G06F 7/00* (2006.01)
*G06F 17/30* (2006.01)

(52) U.S. Cl. ............... 707/5; 707/2; 707/3; 707/7; 705/1; 705/14

(58) Field of Classification Search ............... None
See application file for complete search history.

(56) References Cited

U.S. PATENT DOCUMENTS

| | | |
|---|---|---|
| 5,636,346 A | 6/1997 | Saxe |
| 5,724,521 A | 3/1998 | Dedrick et al. |
| 5,845,265 A | 12/1998 | Woolston |
| 5,918,010 A | 6/1999 | Appleman et al. |
| 5,920,854 A | 7/1999 | Kirsch et al. |
| 5,931,901 A | 8/1999 | Wolfe et al. |
| 5,974,398 A | 10/1999 | Hanson et al. |
| 6,026,368 A | 2/2000 | Brown et al. |
| 6,044,375 A | 3/2000 | Shmueli et al. |
| 6,061,659 A | 5/2000 | Murray |
| 6,067,570 A | 5/2000 | Kreynin et al. |
| 6,078,866 A | 6/2000 | Buck et al. |
| 6,223,163 B1 | 4/2001 | Van Luchene |
| 6,230,170 B1 | 5/2001 | Zellweger et al. |
| 6,247,009 B1 | 6/2001 | Shiiyama et al. |
| 6,253,189 B1 | 6/2001 | Feezell et al. |
| 6,269,361 B1 | 7/2001 | Davis et al. |
| 6,285,987 B1 | 9/2001 | Roth et al. |
| 6,298,348 B1 | 10/2001 | Eldering |
| 6,324,519 B1 | 11/2001 | Eldering |
| 6,336,132 B2 | 1/2002 | Appleman et al. |

(Continued)

FOREIGN PATENT DOCUMENTS

EP    1026610 A2    8/2000

(Continued)

OTHER PUBLICATIONS

Hillis et al. U.S. Appl. No. 60/529,245. filed Dec. 12, 2003.*

(Continued)

*Primary Examiner*—John R. Cottingham
*Assistant Examiner*—Michael Pham
(74) *Attorney, Agent, or Firm*—Fish & Richardson PC (57) ABSTRACT

A system and method for rating an electronic document such as an advertisement. Rating information is received from one or more evaluators. A signal relevant to a criteria is received and a determination is made whether to deliver the document in response to the signal based on the criteria and the rating information from the one or more evaluators.

18 Claims, 6 Drawing Sheets

U.S. PATENT DOCUMENTS

| | | | |
|---|---|---|---|
| 6,421,675 | B1 | 7/2002 | Ryan et al. |
| 6,698,020 | B1 * | 2/2004 | Zigmond et al. ............... 725/34 |
| 7,072,888 | B1 * | 7/2006 | Perkins .......................... 707/5 |
| 7,263,529 | B2 * | 8/2007 | Cordery et al. ............. 707/102 |
| 2001/0042064 | A1 | 11/2001 | Davis et al. |
| 2001/0047297 | A1 | 11/2001 | Wen |
| 2001/0051911 | A1 | 12/2001 | Marks et al. |
| 2002/0002509 | A1 | 1/2002 | Wagorn et al. |
| 2002/0002525 | A1 | 1/2002 | Arai et al. |
| 2002/0026359 | A1 | 2/2002 | Long et al. |
| 2002/0035536 | A1 | 3/2002 | Gellman |
| 2002/0038282 | A1 | 3/2002 | Montgomery |
| 2002/0046099 | A1 | 4/2002 | Frengut et al. |
| 2002/0046104 | A1 | 4/2002 | Kaddeche et al. |
| 2002/0077891 | A1 | 6/2002 | Castle et al. |
| 2002/0099605 | A1 | 7/2002 | Weitzman et al. |
| 2002/0111898 | A1 | 8/2002 | Numaoka et al. |
| 2002/0123988 | A1 | 9/2002 | Dean et al. |
| 2002/0165773 | A1 | 11/2002 | Natsuno et al. |
| 2002/0184097 | A1 | 12/2002 | Hijiri et al. |
| 2002/0194062 | A1 | 12/2002 | Linide |
| 2002/0198780 | A1 | 12/2002 | Kawakami et al. |
| 2003/0009495 | A1 * | 1/2003 | Adjaoute .................. 707/501.1 |
| 2003/0014428 | A1 * | 1/2003 | Mascarenhas ............... 707/200 |
| 2003/0037334 | A1 | 2/2003 | Khoo et al. |
| 2003/0070167 | A1 | 4/2003 | Holtz et al. |
| 2003/0083937 | A1 | 5/2003 | Hasegawa et al. |
| 2003/0126267 | A1 * | 7/2003 | Gutta et al. .................. 709/229 |
| 2003/0149618 | A1 | 8/2003 | Sender et al. |
| 2003/0163372 | A1 | 8/2003 | Kolsy |
| 2003/0216963 | A1 | 11/2003 | Ishiwaka et al. |
| 2003/0217056 | A1 * | 11/2003 | Allen et al. .................... 707/7 |
| 2004/0015397 | A1 | 1/2004 | Barry et al. |
| 2004/0019523 | A1 * | 1/2004 | Barry et al. ..................... 705/14 |
| 2004/0044571 | A1 | 3/2004 | Bronnimann et al. |
| 2004/0054577 | A1 | 3/2004 | Inoue et al. |
| 2004/0054589 | A1 | 3/2004 | Nicholas et al. |
| 2004/0054661 | A1 * | 3/2004 | Cheung et al. .................. 707/3 |
| 2004/0059708 | A1 * | 3/2004 | Dean et al. ..................... 707/1 |
| 2004/0059712 | A1 | 3/2004 | Dean et al. |
| 2004/0093327 | A1 * | 5/2004 | Anderson et al. ............... 707/3 |
| 2004/0093620 | A1 | 5/2004 | Iino et al. |
| 2004/0107363 | A1 * | 6/2004 | Monteverde ................ 713/201 |
| 2004/0119740 | A1 | 6/2004 | Chang et al. |
| 2004/0143499 | A1 | 7/2004 | Dietsch et al. |
| 2004/0143843 | A1 | 7/2004 | Khoo et al. |
| 2004/0167928 | A1 | 8/2004 | Anderson et al. |
| 2004/0199584 | A1 * | 10/2004 | Kirshenbaum et al. ...... 709/205 |
| 2004/0249709 | A1 | 12/2004 | Donovan et al. |
| 2005/0060404 | A1 * | 3/2005 | Ahlander et al. ............ 709/224 |
| 2005/0065806 | A1 | 3/2005 | Harik |
| 2005/0071224 | A1 | 3/2005 | Fikes et al. |
| 2005/0096979 | A1 | 5/2005 | Koningstein |
| 2005/0131758 | A1 | 6/2005 | Desikan et al. |
| 2005/0131762 | A1 | 6/2005 | Bharat et al. |
| 2005/0131918 | A1 * | 6/2005 | Hillis et al. .................. 707/100 |
| 2005/0144069 | A1 | 6/2005 | Wiseman et al. |
| 2005/0144297 | A1 * | 6/2005 | Dahlstrom et al. .......... 709/229 |
| 2005/0204276 | A1 * | 9/2005 | Hosea et al. ............. 715/501.1 |
| 2005/0216335 | A1 | 9/2005 | Fikes et al. |
| 2005/0222900 | A1 | 10/2005 | Fuloria et al. |
| 2005/0222903 | A1 | 10/2005 | Buchheit et al. |
| 2005/0222989 | A1 | 10/2005 | Haveliwala et al. |
| 2005/0223002 | A1 | 10/2005 | Agarwal et al. |

FOREIGN PATENT DOCUMENTS

| | | |
|---|---|---|
| WO | WO 0038074 | 6/2000 |
| WO | WO 2004/042525 | 5/2004 |

OTHER PUBLICATIONS

Chris Sherman, "Google Launches AdWords Select," Feb. 20, 2002, 6 pages.

Google Introduces New Pricing For Popular Self-Service Online Advertising Program, http://www.google.com/press/pressrel/select.html, p. 1-2, dated Feb. 20, 2002, printed on Jul. 29, 2003.

Collection of pages from www.overture.com, printed on Jul. 29, 2003.

Collection of pages from findwhat.com, http://www.findwhat.com, printed on Jul. 29, 2003.

Collection of pages from Sprinks.com, http://www.sprinks.com, printed on Jul. 29, 2003.

Collection of pages from Kandoodle.com, http://www.kanoodle.com, printed on Jul. 29, 2003.

Collection of pages from Google Advertising, http://www.google.com, printed on Jul. 29, 2003.

* cited by examiner

Evaluator Questionnaire

Document: Petchow Dog Food Advertisement
Owner of Document: OwnerCo, Inc.
Creator of Document: CreatorCo, Inc.

Name of evaluator:
Address:
City, State, Country:
Evaluator entity:

On a scale of 1-10, where ten is the largest amount (or highest degree) and one is the smallest (or lowest), please rate the document according to the following criteria:

1. Violent content:
2. Sexually explicit content:
3. Content inappropriate for children:
4. Content inappropriate for teenagers:
5. Content relating to the consumption of alcohol or drugs:
6. Content inappropriate for persons of a particular race:
   please name the race ______
7. Content inappropriate for a specific religion or creed:
   please name the creed ______
8. Content inappropriate for a specific national origin:
   please name the national origin:
9. Foreign language content:
10. Offensive audio content:
11. Offensive video content:
12. Is this document suitable for children? (Yes/No) ____
13. What time of day may this document be shown (check all that are applicable):
    ______ 6am-7pm; ______ 7-11pm; ______ 11pm-6am
14. Is there any reason this document is not suitable for the average person?
    If yes, please explain: __________

A. How many inappropriate words were used in this document?
    If yes, which word(s)?
B. What is the length of this document?

FIG. 5

Evaluator Questionnaire

Document: Petchow Dog Food Advertisement
Owner of Document: OwnerCo, Inc.
Creator of Document: CreatorCo, Inc.

Name of evaluator: John Smith
Address: 123 Oak Terrace
City, State, Country: Springfield, IL
Evaluator entity: Booze DistributorCo.

On a scale of 1-10, where ten is the largest amount (or highest degree) and one is the smallest (or lowest), please rate the document according to the following criteria:

1. Violent content: 4
2. Sexually explicit content: 6
3. Content inappropriate for children: 5
4. Content inappropriate for teenagers: 1
5. Content relating to the consumption of alcohol or drugs: 1
6. Content inappropriate for persons of a particular race: No
    please name the race _______
7. Content inappropriate for a specific religion or creed: No
    please name the creed _______
8. Content inappropriate for a specific national origin: Yes
    please name the national origin: Canada
9. Foreign language content: minimal
10. Offensive audio content: heavy metal music in background
11. Offensive video content: woman wearing bikini
12. Is this document suitable for children? (Yes/No) ____
13. What time of day may this document be shown (check all that are applicable):
    _______ 6am-7pm;  _______ 7-11pm;  _______ 11pm-6am
12. Is there any reason this document is not suitable for the average person? No.
    If yes, please explain: __________

A. How many inappropriate words were used in this document? 1
    If yes, which word(s)? sucks
B. What is the length of this document? medium

FIG. 6

SYSTEM AND METHOD FOR RATING ELECTRONIC DOCUMENTS

FIELD OF THE INVENTION

The present invention relates to a system and method for rating a document by aggregating a plurality of ratings from partner evaluators.

BACKGROUND OF THE INVENTION

With the advent of the Internet, a seemingly limitless variety of content may be provided to people of varying ages, preferences, and sensibilities. Some content may be more appropriate for some individuals and groups than for others. For instance, violent or pornographic content is typically deemed inappropriate for children. Providing audience-appropriate content is desirable because it generally maximizes benefits and minimizes burdens for both the content provider and the audience. For instance, an audience-appropriate and relevant ad is more likely to generate a sale than an offensive and irrelevant one.

Accordingly, ads and other content are often targeted to specific audiences that may have an interest in the content. For instance, ads directed to males may be displayed during nationally televised football events because they draw large numbers of male viewers. Similarly, an ad for an airline may be displayed at an Internet search engine site when a user submits a query including the word "plane."

However, providing ads and other documents based on user-related content does not ensure the propriety of that content for a particular audience. For instance, a beer advertisement may not be appropriate on a website for recovering alcoholics, even though the ad and the content of the website are related by subject matter.

One method of matching appropriate content to an audience is to manually review the content before distributing it to the audience. However, there are problems associated with manual review. For example, one significant drawback of manual rating systems and methods is the time and expense involved in reviewing the content.

These and other drawbacks exist with current systems and methods.

SUMMARY OF THE INVENTION

Accordingly, various embodiments of the present inventions may be directed to a system and a method for rating documents such as advertisements. In one exemplary embodiment, a system and method for rating an electronic document such as an advertisement is provided. Rating information is received from one or more evaluators. A signal relevant to one or more criteria is received and a determination is made whether to deliver the document in response to the signal based on the criteria and the rating information from the one or more evaluators.

In another exemplary embodiment, a method and system of determining an aggregate rating for a document involve receiving rating information for an electronic document from a plurality of evaluators, wherein at least one evaluator is associated with a trust score, and determining an aggregate content rating for the electronic document by aggregating the rating information from at least two of the plurality of evaluators, wherein the rating information for at least one evaluator is considered in association with the trust score for that evaluator.

In another exemplary embodiment, a method and system for transmitting a signal that receives a rated document involves transmitting a signal to a server, the server interpreting the signal as being associated with one or more criteria for a document and determining whether a document is to be delivered based in part on rating information received from a plurality of evaluators for one or more documents and whether the one or more documents relate to the criteria. Any identified documents are then received in response to the signal.

In another exemplary embodiment, a method and system for receiving documents and rating them involves receiving one or more documents from a server system and providing rating information to the server system for use by the server system in determining whether to deliver the one or more documents in response to requests for the one or more documents based on the rating provided.

Other embodiments are also within the scope of the invention.

BRIEF DESCRIPTION OF THE DRAWINGS

FIG. 6 depicts an exemplary content rating according to an embodiment of the invention.

DETAILED DESCRIPTION OF EXEMPLARY EMBODIMENTS

The embodiments described herein solve many problems with existing systems and methods. One problem facing internet content providers is evaluating a large number of documents (such as advertisements presented through its services) to determine whether each is appropriate for a wide variety of different users. Embodiments described herein overcome these and other problems by dividing the labor to evaluate a large number of documents among a number of different evaluator entities. Each evaluator may review a small number of documents for example, although certain evaluators may review a large number as well. Collectively, a plurality of ratings may be collected and a reliable, aggregate rating may be determined for each document.

Another problem facing internet content providers is selecting appropriate content each time a document is requested by a different user with different sensibilities and preferences. Embodiments described herein overcome these problems by determining a generally applicable, aggregate content rating for each electronic document. Instead of re-evaluating a document each time it may be provided to a user, the content provider may only review or process the document's aggregate content rating in order to match appropriate content with a user or provider. Each time the document is distributed, the suitability of the document to a particular audience may be efficiently determined with reference to the content rating and audience suitability data.

Yet another problem is that content providers may, in some circumstances, be held to a higher duty (e.g., legal duty) of appropriate content distribution when the content provider is aware of offensive content. In an exemplary embodiment, the content provider relies on rating(s) by others and thus may not incur a higher duty. Rather, the server at least partially delegates the review of its content to evaluators (e.g., third parties, such as partner advertisers or others). Because the content provider takes active steps to ensure that content is appropriate for end users, the content provider may be deemed to have satisfied general duties of care in preventing the improper distribution of offensive content.

As used herein, the term "document" and "electronic document" may encompass one or more advertisements, content pages (e.g., web pages), search results, emails, applications, IM messages, audio content or files, video content or files, other files, other data or applications that may reside on one or several (e.g., a network) of computer systems, or other definable concepts or content.

Overview and System Illustration

According to one exemplary embodiment, one or more document sources 12 provide one or more documents to a server 2. Although a single server 2 is depicted, it should be appreciated that multiple servers 2 may be provided and that such multiple servers may share data and operational tasks to best achieve efficiency and operation of the functions described herein. Server 2 may select one or more documents (such as an advertisement) and one or more evaluators 4 to rate the document. Server 2 may pass the one or more documents to one or more selected evaluators 4, or may otherwise make the document available to the one or more evaluators 4 for rating. Evaluators 4 rate the document(s) according to one or more criteria, such as sexual content and violent content. Evaluators 4 pass their rating to server 2. Server 2 may determine an aggregate rating for the document by processing all or a subset (one or more) of the document's associated evaluator ratings. For example, if a document is evaluated by ten evaluators, the aggregate rating may be based on any one of one through ten of the evaluators' ratings. For example, the aggregate rating may be based on the middle six, or some other combinations of evaluations.

One or more documents may be requested from server 2. For instance, a provider 8 and/or end user 10 may request the document. The request may come in the form of a signal that the server interprets as a request for the document, even though the signal does not specifically indicate that a document is being requested. For example, an end user may transmit a signal to a server that requests a web page, and that signal may be interpreted as a request for an advertisement document as well. The server 2 may determine whether any documents are available to respond to the signal based on one or more potential documents' rating and/or one or more criteria (e.g., whether the document meets or is related to content associated with the signal). Server 2 may pass one or more documents to a recipient, such as the requesting entity. The server 2 may identify other criteria associated with the signal (and/or the recipient of the document, if different from the requestor). While the criteria may be based on the content of the signal or request for a document (e.g., a search request for a keyword or the like), the criteria may also be based on preferences associated with the recipient. For instance, the server 2 may identify sensitivity information and/or suitability information associated with the requestor or recipient. If the recipient is identified with a preference against violent content, the server 2 may determine whether any available documents have a rating indicating low violent content.

Figure 1:
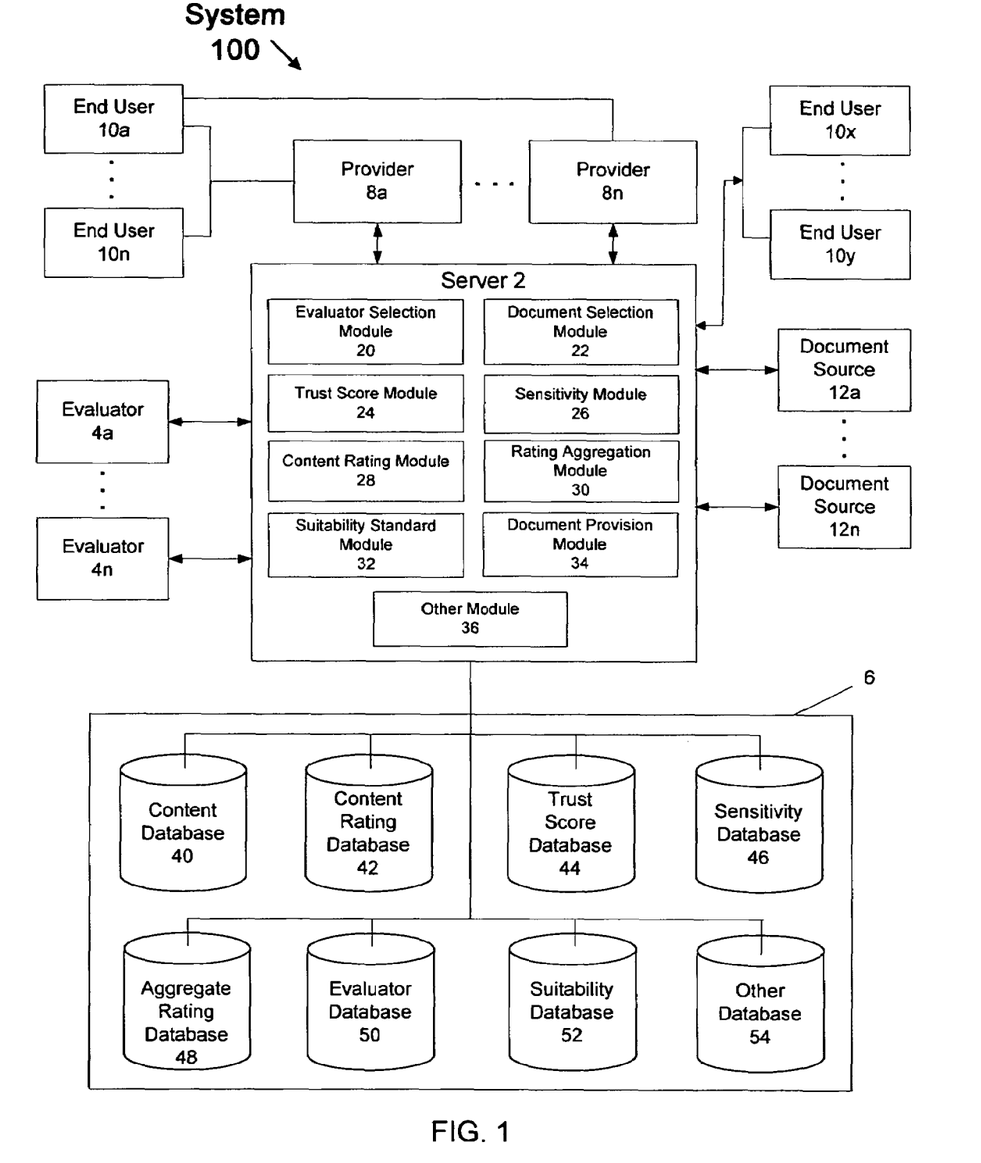
FIG. 1 depicts a system for rating an electronic document according to an embodiment of the invention.

FIG. 1 depicts a system 100 for rating an electronic document according to an embodiment of the invention. The system comprises a server 2, one or more evaluators 4, one or more providers 8, one or more document sources 12, one or more end users 10, and one or more databases 6 operatively connected to server 2.

System 100 enables server 2 to request, receive, and/or process content ratings of electronic documents. Document sources 12, evaluators 4, providers 8, and end users 10 may communicate with one or more servers 2 via electronic communication, including Internet communications. Document sources 12, evaluators 4, providers 8, and end users 10 may include or have access to one or more servers 2 for providing functionality associated with electronic documents.

Information that may be communicated between and among server 2, evaluators 4, providers 8, document sources 12, and end users 10 may include one or more of the following: document information, content rating information, sensitivity rating information, suitability standard information, trust score information, and/or evaluator or provider information. The document information may include one or more of the following: the document itself, any language(s) used in the document, length information, file type information (e.g., html, doc, zip, etc.), type of document (advertisement, educational document), summary information, audio-visual content (e.g., pictures of faces, song lyrics, etc.), pornographic content, other offensiveness content (e.g., use of potentially offensive words), age-related content, the identity of the document owner and/or the document creator, information about the document's intended audience (such as geographic area, age range, gender, race, national origin, religion, other demographic information), and any other information related to a document or to the server 2, evaluators 4, providers 8, or document sources 12.

Document sources 12 may provide documents to server 2 or server 2 may "pull" or retrieve documents from document sources 12. For instance, the document source 12 may provide an advertisement to server 2 so that the server 2 may then provide the advertisement to one or more content providers 8 that may provide the ad to one or more end users 10 (or server 2 may provide the ad directly to the end user 10). Document sources 12 may include any content creator or content provider 8, such as an advertisement listings provider or server.

Providers 8 may provide documents to one or more end-users, 10a through 10n. Providers 8 and evaluators 4 may include a content provider, search engine or other entity that makes available information, services, and/or products over an electronic network, such as the Internet. A provider 8 may include one or more of the following, for example: an advertisement listings provider, an electronic document provider, a website host, a server, any other entity that provides electronic documents to users or other entities, or any other provider of content. A provider 8 may be an evaluator 4 or a document provider 12.

Similarly, an evaluator 4 may be a provider 8 and/or a document provider 12. An evaluator 4 may be one or more persons or groups. The evaluators 4 and providers 8 may be partners of an entity associated with operating server 2. An end user 10 may be one or more persons, computers, computer networks, or other entity on a network. An end user 10 may request and receive content from a provider 8 and/or server 2. Additional participants may be included based on various applications.

The server 2 may comprise any server, hub, central processor, provider, search engine, or other entity in a network. A database 6 coupled to the server 2 may include one or more databases 40-54. Also, databases 40-54 may comprise portions of a single database 6. It should be appreciated that the databases 40-54 may or may not be physically distinct. The server 2 and its modules 20-36 may store and access information stored in the database(s) 6, 40-54.

A content database 40 may store documents. The documents may be rated and/or unrated. The documents may be received from document sources 12, evaluators 4, and providers 8, or they may be otherwise stored by the server 2. The content database 40 may identify documents of a certain type and/or group or otherwise associate documents together. For instance, documents may be identified and/or associated with other documents according to one or more of the following features: subject matter, content rating, aggregate content rating, sensitivity score, content type, language, geographic origin (e.g., country or city of origin), geographic area of target audience, document source 12, owner of content, creator of content, target demographic, or other criteria. For instance, the documents may be identified or grouped according to their offensiveness content, pornographic or other prurient content, adult content, children's content, or target age, gender, race, national origin, or religion. Other factors related to matching content to an appropriate audience can be considered.

A content rating database 42 may store content ratings received from evaluators 4 and any other information that may be relevant to rating a document. For instance, the content rating database 42 may store information relating to number of clicks on a document, information relating to complaint letters filed for a document, verification information (such as a content creator vouching for the appropriateness of a particular document), and third party determinations relevant to the content of a document. Each stored content rating may be associated with a particular evaluator 4 and a particular electronic document. Each content rating may comprise one or more subject ratings (see FIG. 5). For instance, a content rating may include a rating for violent content and a separate rating for sexual content. These separate ratings need not be combined into a single score.

A trust score database 44 may store trust scores associated with one or more evaluators 4. A single evaluator 4 may have one or more trust scores associated with it. The single evaluator 4 may have a different score for different types of content rating subject areas. For instance, an evaluator 4 may have a high trust score with respect to age appropriateness ratings, but low trust scores with respect to violence ratings. An evaluator may also have different trust scores according to any of the following criteria: time (e.g., time of day, day of year), geographic location of evaluator, document recipient profile, size of evaluator entity, business area or industry of evaluator, prior evaluator rating consistency or accuracy, terms of agreement between evaluator 4 and server 2 (if any), and trust ratings of the evaluator 4a by other evaluators 4b-4n. Evaluators 4 may automatically be assigned a low trust rating when evaluating their own content.

Trust scores may be normalized or otherwise adjusted for one or more evaluators 4. For instance, trust scores may be adjusted to reflect that an evaluator 4a consistently provides higher or lower ratings, e.g., ratings of a particular type (violence) for content of a particular type (ads). For instance, an evaluator 4a may provide adult content ratings that are at least one standard deviation of the mean higher than the ratings of other evaluators 4b-4n in 80% of the evaluator's 4a ratings. This may indicate to the system that, on average, the evaluator's 4a adult score ratings are likely to be higher than average in future ratings, e.g., future ratings of a particular type for content of a particular type.

Other information can be determined, deduced, or inferred from the rating behaviors of one or more evaluators. For instance, if evaluator A provides a higher adult content rating for document XYZ than evaluator B, and evaluator B provides a higher adult content rating for document QRS than evaluator C, then the system might assume that evaluator A provides (or will provide) higher adult content ratings than evaluator C. As a result, the system may adjust (e.g., lower) the trust score for evaluator A (or B or C) in a future rating, such as a rating that includes an adult content rating from both A and C.

Similarly, instead of (or in addition to) adjusting the trust scores of evaluators, the ratings themselves may be normalized or otherwise adjusted, e.g., as described above for trust scores. For instance, for a particular evaluator 4a who consistently provides high violence ratings compared to similarly situated evaluators' 4b-4g ratings of the same or similar content, the violence ratings of that particular evaluator 4a for that type of content may be adjusted downward.

It should be noted that because evaluations may be requested and received from hundreds (or perhaps thousands or millions) of evaluators 4, biases and other rating behavior can be tracked and predicted for large numbers of users, content types, rating categories, and other criteria. Normalization and other statistical and/or data processing techniques can be used to process the data, as will occur to those skilled in the art. The processed data can be used to adjust ratings, trust scores, aggregate ratings, and other calculations and information.

A sensitivity database 46 may store sensitivity information for evaluators 4, providers 8, end users 10, document sources 12, the server 2, a specific document, or other sensitivity information. A sensitivity score may indicate the level of conservatism by which to aggregate content ratings. For instance, a high sensitivity score (e.g., 95%) may indicate that the aggregate rating should be aggregated very conservatively. A conservative aggregation might mean that if one evaluator 4a rated a document as inappropriate for children, then the aggregate rating will also indicate that the document is inappropriate for children, even if the "average" rating would indicate that the content is appropriate for all ages. A sensitivity score may be specified by a provider 8 and/or end user 10, or any other entity. For instance, a provider 8 may specify a very high sensitivity to violent content and to sexual content and a low sensitivity to age-related content. Thus, when the server 2 selects a document for that provider 8, the server 2 might select a document where none (or very few) of the document's evaluators 4 found any sexual or violent content, where the document may have content directed towards an audience of any age.

For instance, the sensitivity database 46 may comprise a record indicating that Provider A (or a particular end user 10a) has a sensitivity score of 55% for sexual content and a sensitivity score of 20% for age-related content.

An aggregate rating database 48 may store aggregate ratings. Each aggregate rating may be associated with the rated document as well as the evaluators 4 used to determine the aggregate rating. The aggregate rating may also be associated with one or more sensitivity ratings and trust scores. Each aggregate rating may include content ratings across a variety of criteria. The content of an aggregate rating is described further below with respect to the rating aggregation module 30.

An evaluator database 50 may store evaluator information. For instance, the evaluator database 50 may store information related to the trust score of a particular evaluator 4. The evaluator database 50 may store such evaluator 4 information as the evaluator name, address, country of origin, company size, prior content rating information, industry field, company reputation information, prior trust scores, and other information that may be related to an evaluator's trust score.

A suitability database 52 stores information about providers 8 and end users 10 who may request documents. For instance, the suitability database 52 may identify the gender, age, name, country of origin, and other personal information about an end user 10 or other content requestor. This profile would be different from another end user 10 who was a 62-yr-old male from Spain. Each user 10 and/or provider 8 might have a set of suitability standards associated with them and stored in the suitability database 52.

Other database(s) 54 may store other information relating to the evaluators 4, providers 8, end users 10, document sources 12, server 2, content ratings, aggregate ratings, trust scores, suitability scores, and sensitivity scores.

The server 2 may comprise one or more modules to process content, ratings, and other data.

A document selection module 20 may select documents to be rated. The module may select the documents stored in the document database 40. The document selection module may select the documents randomly, or it may select documents with particular features. For instance, the document selection module 20 may select documents provided by a particular document source 12, documents rated by a particular evaluator 4, documents of a particular length or type (e.g., short advertisements). Documents may be selected according to subject matter, financial data, performance data, geographic origin, identity of owner, identity of creator, and/or other information associated with the document. For instance, an advertisement with a high click-through-rate (CTR) may be selected for rating before an advertisement with a low click-through rate. A web page from an alcohol distributor may be selected prior to an advertisement from a utensil manufacturer.

An evaluator selection module 22 may select evaluators 4a-4n for evaluating one or more electronic documents. Evaluators 4 and associated documents may be selected randomly or by other methods. For instance, evaluators 4 may be selected randomly from a group of evaluators of a specific type, such as a group of partner advertisers or advertising listing partners. Evaluators 4 may be selected according to any criteria, such as the trust score of the evaluator.

Unrated documents may be selected for rating prior to (or after) rated documents. Some evaluators 4 may submit some of the rate-able documents to the server 2. These evaluators 4 may or may not be selected to review the documents. In one embodiment, entities that provide rate-able content to the server 2 rate the content before providing it to the server 2.

A trust score module 24 determines trust scores for evaluators 4. A trust score of an evaluator 4 is a measure of the extent to which the evaluator's 4 content rating will be considered in determining an aggregate rating. For instance, the content rating of a highly trusted evaluator 4 may be given greater weight in the calculation of an aggregate rating than a less trusted evaluator 4. Trust scores may be determined according to any of the following factors related to an evaluator 4: evaluator name, company, size of company, location (and national origin) of evaluator, language of evaluator, reputation of evaluator, company industry, prior content ratings, number of prior content ratings, and a comparison between prior content ratings and an associated aggregate rating or associated content ratings by other evaluators.

A sensitivity module 26 may determine sensitivity scores for a Provider 8, an end user 10, an evaluator 4, and/or the server 2. These scores may be based on information collected regarding those entities, such as prior rating data and any information stored in any of the databases 6. A high sensitivity might indicate a higher degree of conservatism in determining an aggregate rating. For instance, if a provider 8 has complained of receiving inappropriately violent content in the past, the sensitivity module 26 may associate a high violence sensitivity score with that provider.

Figure 5:
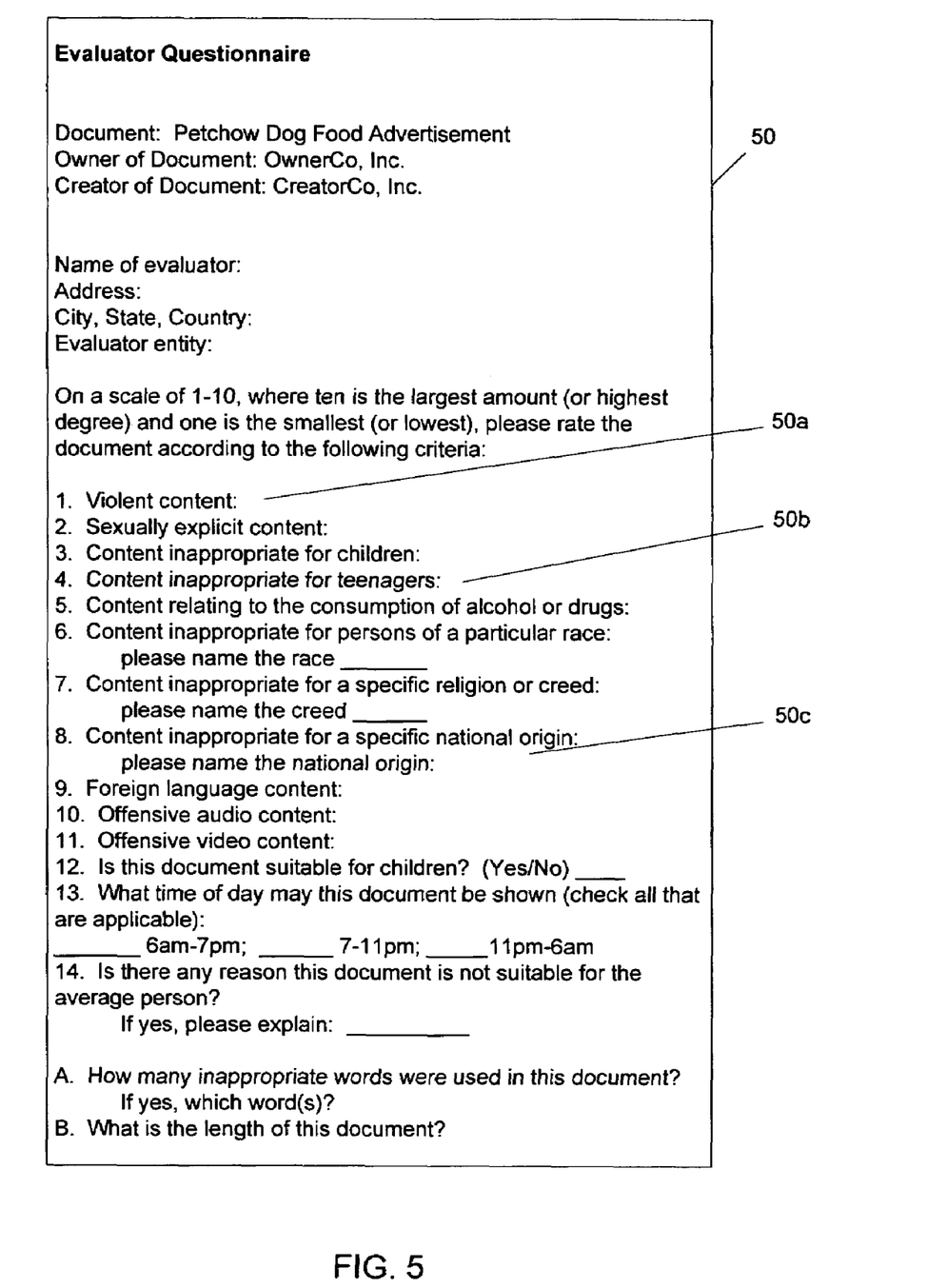
FIG. 5 depicts an exemplary content rating request according to an embodiment of the invention.

A content rating module 28 may create content rating requests and pass them to evaluators 4. An exemplary content rating request is shown in FIG. 5. The content rating request may comprise a list of information requested for a document to be rated. The information requested may be different (or the same) for each document. The content rating request may be different for each document. For instance, a request to rate a beer advertisement may request detailed information about the way that alcohol is portrayed, while a request to rate a power tool merchant's website might not. The content rating module 28 may also receive and process content ratings received from evaluators 4. The content rating requests and content ratings may be communicated via traditional mail, email, or other methods. For instance, the server 2 may send to an evaluator 4 a link to a server 2 website that contains the document and associated content rating information. The evaluator may then access the document and provide the content rating directly on the server 2 site. The content rating module 28 may then electronically process the rating information.

A rating aggregation module 30 may determine an aggregate rating for a document by processing one or more content ratings of the document received from one or more evaluators 4. The rating aggregation module 30 may use any aggregation algorithm or methodology. For instance, the aggregation may be a total score, a mean, a mode, a median, a step function, a $75^{th}$ percentile score, or any other measure that relates to the data considered. The algorithm may consider one or more of the following, for example: content ratings, sensitivity information, suitability information, trust score information, document performance data (such as click through rate and frequency of display), and other information relevant to the evaluators, document, document content, or aggregation. For example, in one specific iteration, the rating aggregation module 30 may mark a document as violent if any content ratings indicated any violence whatsoever. This may occur when a high sensitivity to violence is incorporated into the algorithm. Another algorithm may determine a high violence score only if a supermajority of evaluators 4 rated the document to have strong violence. The algorithm may weight the ratings of different evaluators differently according to each evaluator's trust score (if any). For instance, a highly trusted evaluator's violence rating may count three times as much as a less trusted evaluator's violence rating. Other examples are also possible.

An aggregate rating may comprise one or more distinct numerical scores (e.g., for different subject areas like sexuality and violence) and/or one or more verbal scores. A verbal score may be a word (e.g., essay) analysis of a feature of the document. For instance, an evaluator may provide a numerical score of 4/10 in a "sexual content" category, and the evaluator may also verbally state that the document "includes a half-clothed woman with a sexually suggestive look in her eye." It may also comprise one or more binary scores (such as yes/no or flag/no-flag). For instance, if three of five evaluators flagged a document as pornographic in their content rating, the rating aggregation module 30 may flag the document as pornographic. The numerical scores may comprise one or more measures of a total rating in a particular subject area, and the numerical scores may also indicate other information about the various ratings aggregated. For instance, a score may comprise a mean in addition to a standard deviation of the mean. The aggregate rating may comprise a multidimensional vector coupled with verbal responses.

Rating aggregation module 30 may also determine that particular documents may be subjected to additional review. For instance, if a less trusted evaluator marked a document as pornographic, the document may be marked for further review (such as by manual review by the server 2 or its agents). The rating aggregation module may update aggregate ratings (e.g., automatically) at specific times or as new ratings are input into the system.

A suitability standard module 32 may identify or determine suitability standards of document recipients such as providers 8 and end users 10. The suitability standards may be based on provider 8 or user 10 information, such as the information described above. The suitability standards may be identified by the suitability standard module 32. For instance, a suitability standard for a user identified to be a twenty-year old male viewing a pop musician's website might indicate that a small amount of violent and sexual content may be appropriate for the user, but that alcohol-related content is not. The suitability standard may be used to select a document appropriate for that user.

When server 2 attempts to select one or more documents for potential delivery to a requesting service provider 8 or end user 10, the suitability standard module 32 may attempt to determine whether any information relating to the preferences of the provider 8 or end user 10 are stored in the suitability database 52. If a suitability standard exists for a potential content recipient, the document provision module 34 may select a document that satisfies the suitability standards (e.g., a document that contains very little violent content). A similar, but slightly different, method of identifying appropriate content may be accomplished using sensitivity scores, as described herein.

A document provision module 34 may select and provide documents in response to a request from a provider 8, end user 10, or other entity. For instance, a children's book retailer may request an advertisement to display on their site. In response, the document provision module 34 may identify or determine sensitivity score information and suitability information associated with the children's book retailer and then select a document based on this information (such as an identified suitability standard). For instance, if the site is associated with a high sensitivity to violent content, the document provision module 34 may select content that has an aggregate rating indicating zero violent content. The document provision module 34 might also select a document that was verified by a trusted evaluator to have no objectionable violent content.

Document selection may be based on the aggregate rating associated with the document, as well as suitability and/or sensitivity information. For instance, the document provision module 34 may determine that the provider has a high sensitivity against prurient content and therefore select a document where no evaluator found pornographic content—or where no evaluator found sexual content of any kind. The document provision module 34 may also determine that the provider prefers documents with an aggregate rating that indicates a high value in the category of child content and therefore select a document containing substantial children's content.

By identifying a suitability and/or sensitivity score for particular providers 8 and end users 10 (or other entities that receive documents), a document may be chosen that fits a suitability profile (or standard) associated with that entity. Thus, end users may receive non-offensive content, and content providers may ensure the propriety of the content provided on their sites.

Other module(s) 36 may accomplish other functions related to rating electronic documents.

Illustrative System Network Environment

Figure 2:
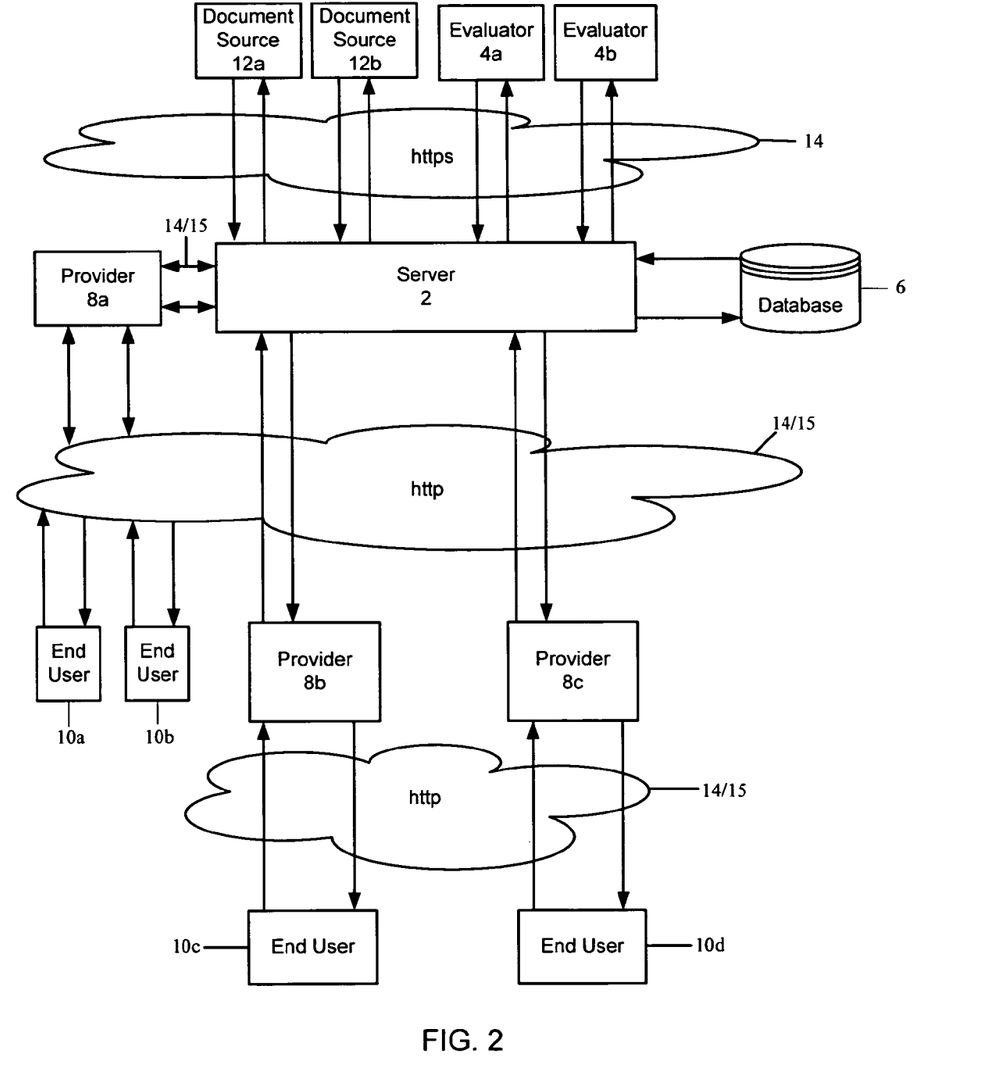
FIG. 2 depicts a networked environment for operation of a system for rating a document according to an embodiment of the invention.

FIG. 2 depicts a networked environment for operation of a system for rating a document according to an embodiment of the invention. In such an environment, evaluators 4 and providers 8 may connect over a network 14, 15 to a server 2 (e.g., using a secure https connection) to provide documents and rating information to server 2 and to receive documents and rating request information from server 2. The server 2 may store the document and rating information in a database 6. The server 2 may distribute the documents through various forums or feeds, including direct distribution in print media, providing the documents on one or more web sites affiliated with the server 2 and through providers 8. It should be noted that providers may comprise syndication partners of the server 2 (e.g., connected over network 14 or 15 depending on security desired), content systems (e.g., with associated content databases) and search engine systems operated by the server 2 or provider(s) 8.

Through these various forums, the documents provided to the providers 8 may be included in pages (or other documents) displayed to end-users 10 (often called an impression).

Each of server 2, evaluators 4, providers 8, and document sources 12 may comprise computerized systems that include one or more of the following systems: a web server, a database server, proxy server, network balancing mechanisms and systems, and various software components that enable the system to operate on the internet or other network type system. Additionally, networks 14 and 15, although depicted as http networks, may comprise other networks such as private lines, intranets, or any other network. In an exemplary embodiment, the connection between a document source 12 such as an advertisement provider and server 2 (and other connections such as between a provider 8 and server 2) may comprise secure network connections to insure that data is not subject to attack or corruption by any hacker or other third party. In addition, whereas two evaluators 4 and two document providers 12 are depicted, it should be appreciated that one or more evaluators 4 and one or more document providers 12 may be provided in the network. Similarly, although one database 6 is depicted, it should be appreciated that multiple databases 6 may be provided and that such databases 6 may be connected to the server 2 via any type of network connection, including a distributed database server architecture.

Similarly, provider 8a may comprise any number of such systems connected to the evaluator 4 or server 2 via any type of network, including an http or https network. Content provider 8 may comprise a system such as server 2 that provides functionality for enabling connection over the internet or other network protocols. End users 10 may comprise any user (such as users connected to the internet) and may comprise computerized systems that enable that connection through any of various types of networks, including through internet service providers, cable companies, and any other method of accessing data on the internet. Providers 8 may comprise any system that distributes content such as advertising to end-users 10.

Illustrative Process

Figure 3:
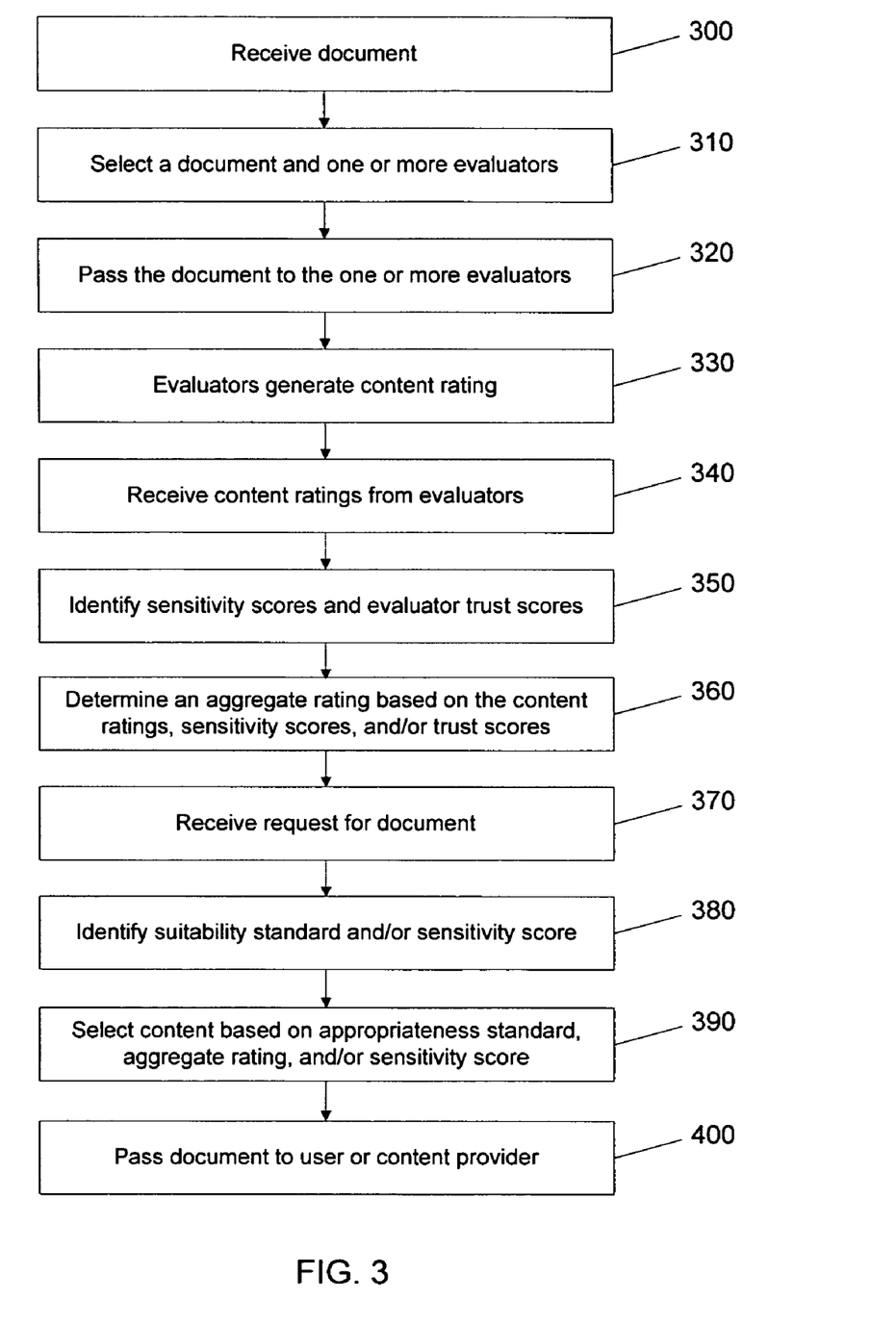
FIG. 3 depicts a flow chart illustrating an exemplary method for rating an electronic document according to an embodiment of the invention.

FIG. 3 is a flow chart illustrating an exemplary method for rating an electronic document according to an embodiment of the invention. The method described herein may be implemented by the systems described in FIGS. 1 and 2.

In block 300, one or more documents may be received. For instance, the server may receive one or more advertisements from one or more partner advertisers or other content providers. Alternately or in addition, the server may generate one or more documents.

In block 310, the server may select one or more documents to pass to one or more evaluators. For instance, the server may pass the document to one or more partner advertisers or content providers, in which case these entities may be evaluators. These evaluators may be the same or different entities from which a document was received in block 300 (i.e., the server may select the original provider of the document (from block 300) to be one of the evaluators in step 310).

The server may select the documents and evaluators randomly or based on an algorithm and/or one or more criteria. The document may be selected from among a plurality of documents, and the evaluators may be selected from among a plurality of evaluators. It should be understood that while this description discloses the method of rating an electronic document, many documents can be rated using this method at the same time. For instance, as each additional document is received by the server, the documents may be automatically passed to several evaluators selected immediately by the system.

In block 320, the selected document may be passed to the one or more evaluators. For instance, the server may pass the document to one or more partner advertisers who will rate the document. The server may also transmit rating instructions to the evaluators 4 that describe the various ratings requested for the document. For instance, the server may request each evaluator to rate the document according to a variety of criteria such as target age range, family content, violent content, and other criteria.

In block 330, the evaluators may generate one or more content ratings associated with the document. For instance, a partner evaluator may have an one or more evaluator employees or agents review the document and rate the document in each category specified by the server. The content ratings may be numerical scores (e.g., a number between 1 and 5, or another number or percentage), codes (such as "V" for violent), or verbal comments (e.g., essay responses).

In block 340, the content ratings may be received from the evaluators. For instance, the content ratings may be received by the server from the partner advertisers.

In optional block 350, sensitivity ratings and evaluator trust scores may be identified. For instance, the server may identify trust scores associated with one or more of the evaluators that submitted content ratings for the document. Trust scores may be determined and identified as described for the trust score module 24 of FIG. 1, and sensitivity scores may be determined and identified as described for the sensitivity module 26 of FIG. 1.

In block 360, an aggregate rating may be determined. The aggregate rating may be based on one or more of content ratings, sensitivity scores, and trust scores. The aggregate rating may be determined by any method as described above for the rating aggregation module 30 (see FIG. 1).

In block 370, a request for a document may be received. For instance, the server may receive a request for a document from a provider 8 or an end user 10. In block 380, a suitability standard and/or a sensitivity score may be determined.

In block 390, a document may be selected. For instance, a server that receives a request for a document from a user or provider may select a document for the user or provider. The selecting may be based on a suitability standard of the user or provider, one or more aggregate ratings of the document, and/or sensitivity scores associated with the evaluators, server, provider(s), and/or user(s).

In block 400, one or more selected documents may be passed to the requesting entity. For instance, if a provider or user requested a document in block 370, the server may pass the selected document to the provider or user, as the case may be.

It will be appreciated to those skilled in the art that the acts described may be performed by hardware, software, or a combination thereof, with or without human intervention, as may be embodied in one or more computing systems such as a server system coupled to entities such as providers, evaluators, and end users. Further, it should be appreciated that not all of the blocks must be accomplished. For instance, in one embodiment, the method may begin at block 340 and end at block 390. Also, it is not necessary that the action(s) of each block be performed in the order shown in FIG. 3. Any orderings may be considered.

It should be noted that the aggregate content rating may be determined after a user or content provider requests a document from the server rather than before such request. Because sensitivities, suitability standards, and evaluator trust scores may change over time, and because new ratings may be added for a particular document, the document's aggregate rating may also change. Obtaining an up-to-date rating for a document before providing it to a user or provider may maximize the likelihood that the document is appropriate for the user or provider.

Illustrative User Interface and Results

Figure 4:
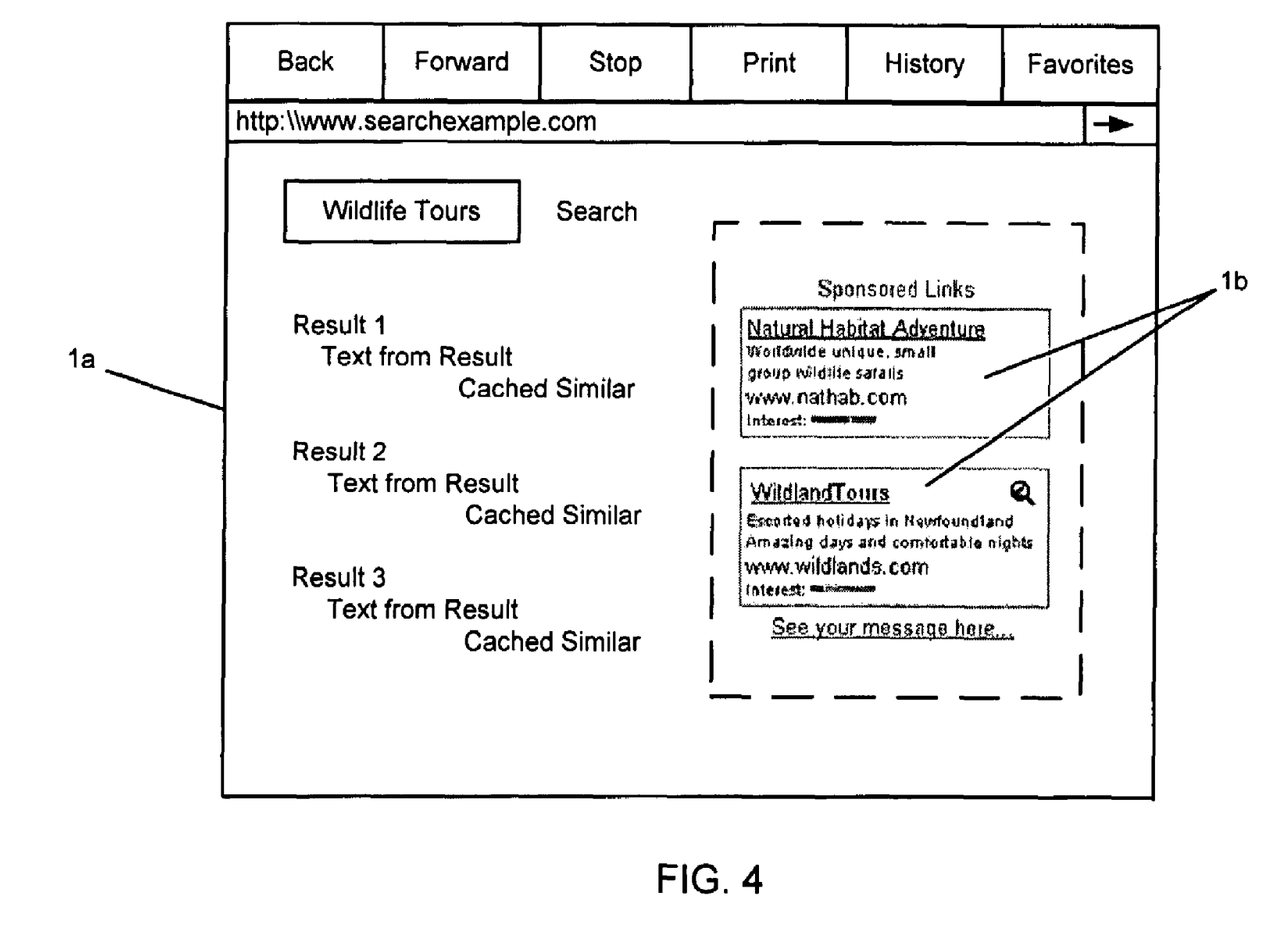
FIG. 4 depicts an exemplary electronic document according to an embodiment of the invention.

FIG. 4 shows an exemplary document 1 according to an embodiment of the invention. FIG. 4 depicts an exemplary web page 1*a* search result from an internet search engine. The web page 1*a* itself may be a document. Content on the web page 1*a* may also be a document. For instance, the advertisements 1*b* on the search result page 1*a* may also be documents. Other types of documents may be considered, such as advertisements, files, programs, and other information.

The document may have various types of content. For instance, the document may have words, images, sounds, and other information, as well as functions or programs which may produce words, images, sounds, and other information. Each document may have different amounts of various types of content, such as sexual content, violent content, drug or alcohol-related content, financial content, adult-related content, child-related content, and other content.

For instance, the document may have a picture of a bikini-clad woman holding a glass of wine and an associated title stating "Fun in the sun with WineCo brand wine." Another document may show a man holding a gun pointed at an icon that says "debt." Another document may state "investments with FundCo yielded 6.25% over prime last year." Another document may show children dancing underneath a rainbow and singing "It's a Small World After All." Another document may have an icon which, when clicked, allows the user to virtually duck hunt by using a cursor to aim a rifle at ducks sitting in a lake, as in a video game.

FIG. 5 shows an exemplary content rating request 50 according to an embodiment of the invention. The content rating request 50 may comprise one or more requests for specific ratings 50*a*-50*c* across a range of subject matter and content types. For instance, there may be requests for ratings for violence 50*a*, teenage appropriateness 50*b*, country-specific suitability considerations 50*c*, and other information. For instance, a content rating request might ask the evaluator to provide a number (e.g., a number between 1 and 10) indicating the amount of sexual content, violent content, adult content, language- or country-specific content, or other types of content or criteria. The request may also request information regarding when (time of day, week, year) the document is most suitable for viewing. The request may also ask the requestor to explain reasons for the requestor's numerical ratings or provide other verbal ratings.

FIG. 6 shows an exemplary content rating 60 according to an embodiment of the invention. The content rating 50 may comprise one or more subject area content ratings 60a-60c for the document, such as ratings for violence 60a, teenage appropriateness 60b, and country-specific suitability considerations 60c, and other information. The content rating may include one or more responses to the content rating request (see FIG. 5). The content rating may indicate numerical or verbal ratings across a variety of criteria, such as sexual content, violent content, adult-themed content, culture-specific content, or other content criteria.

In practice, the server may receive a plurality of documents from document sources. It may select one or more documents (such as five documents) and one or more evaluators to select the one or more documents. For instance, the server may receive 100 documents and select five for evaluation, and then it may select three raters to rate each of the five documents. (Also and/or alternately, it may send the five documents to a plurality of selected evaluators so that each document has three evaluators, but each of the evaluators does not have all three documents.) The server may send an evaluation request with each document. Alternately, instead of passing the documents and requests to the selected evaluators, the server may merely post the documents and evaluation requests (e.g., evaluation forms) in a database (e.g., on a website) and enable the evaluators to access the database and provide content ratings.

For instance, one content rating 60 of the document with a bikini-clad woman and glass of wine by one evaluator may show a rating of 6 out of 10 for sexual content, a 4 out of 5 for alcohol content, an indication that the document is suitable for children, and the rating may include an indication that the document is most suitable between the hours of 7 p.m. and 6 a.m. A content rating from a second evaluator for the same document may indicate a rating of 7 out of 10 for sexual content, a 3 out of 5 for alcohol content, an indication that the document is suitable for children, and an indication that the document is most suitable between the hours of 4 p.m. and 6 a.m. A content rating from a third evaluator for the same document may indicate an 8 out of 10 for sexual content, a 3 out of 5 for alcohol content, an indication that the ad is not suitable for children, and an indication that the document is most suitable between the hours of 11 p.m. and 6 a.m., and not on holidays.

The server may calculate an aggregate rating for this document based on the three ratings. The server may specify a high sensitivity for children's content and a medium sensitivity for violent content. The server may calculate an aggregate rating for sexual content based on a mean (or median) of the three sexual content ratings, which in this case would be 7 out of 10. The server may calculate an aggregate rating for alcohol content based on a mode (most common score) of the alcohol ratings, which in this case is 3 out of 5. Also, the server may discount the first evaluator's rating of 4 out of 5 if the first evaluator has a low trust score, and a weighted average of the three ratings might be 3.1 out of 5 (which may be rounded to 3). Because the server applies a high sensitivity to children's content, it might determine that the document is not suitable for children because one of the raters indicated that the document was not suitable for children. The server may select the time of day rating of the most trusted evaluator. If the evaluator who indicated that the most suitable hours were between 11 p.m. and 6 a.m., the aggregate rating may indicate that the most suitable hours are between 11 p.m. and 6 a.m. The aggregate rating may also indicate the standard deviation for each component of the aggregate rating, or it may use some other measure to indicate the variance of the different ratings from the different evaluators.

If any of the three ratings was significantly different from the aggregate rating, the rating may be marked for further review. For instance, since only one evaluator indicated that the document is not suitable for children, the server (or agent of the server or another evaluator) may review the document to determine whether the unusual rating was accurate. For instance, the server may review the evaluator's ratings and/or generate (or request) one or more additional ratings for the document. Depending on the results, the server may change the aggregate rating (e.g., by re-calculating it) and/or change the trust score of the evaluator in question for one or more criteria of content.

Aggregate ratings of other documents may also be determined. For instance, the ad with children singing under a rainbow may be rated to have zero sexual content, zero alcohol content, zero violent content, and suitability for any time of day (especially 8 am-6 pm).

An end user or provider may then request a document at midnight. For instance, a client may click on a provider's web page, and the provider may request an advertisement to display to the client on the provider's site. The server may select a document to pass to the provider according to the aggregate content ratings of the various documents. In order to select an appropriate document, the server may also identify sensitivity and suitability information of the requesting provider (or user) and consider other criteria, such as time of request. For instance, the server may identify that the provider has a high sensitivity to sexual content. (In another example, the server may identify (e.g., by using cookies or information stored in a database associated with the user's IP address) the age and gender of the user (e.g., 25 year old male). The server may have assign sensitivity or suitability criteria, e.g. for the time of day. For a request at midnight, the server may assign lower sensitivities to sexual and violent content than the middle of the day, since it is far less likely that children will be browsing the internet at that time. The relevant time may be from the perspective of the server, provider, or end user.

The server may accordingly select a document that is suitable for a provider who has a high sensitivity to sexual content and a medium sensitivity to violent content. The server may consider for selection all or a portion of documents stored in a database, including the bikini/wine document, the singing children, and the duck hunting documents. For instance, the server may consider only those documents which have an aggregate rating indicating little or no sexual content and only mild (or less) violence. In the middle of the day, the server might apply a high sensitivity to violent content due to the time of day and may therefore only consider non-violent documents at that time. At midnight, however, the server might consider other documents that may not be appropriate to users at an earlier time.

The server may then search for a document that fits the various criteria associated with the document request and the relevant sensitivity and suitability information. Although the children singing may have no offensive or potentially offensive content, it also may have a low click through rate and therefore not be selected. It should be noted that documents which have little or no potentially offensive content may or may not be favored over documents which do contain potentially offensive material. Here, the duck hunting document may be selected if its aggregate rating indicates only mild violence. The selection of this document may be more likely if it is an ad with a high click through rate. Other factors of document selection may be considered.

The embodiments of the present inventions are not to be limited in scope by the specific embodiments described herein. For example, although many of the embodiments disclosed herein have been described with reference to advertisements, the principles herein are equally applicable to documents and other content. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A method comprising the steps of:
   receiving, at a server comprising a central processor, rating information associated with contents of a document from one or more evaluators;
   identifying, at the server, a trust score for each of the one or more evaluators, each trust score for each of the one or more evaluators being a measure of an extent to which a respective evaluator's rating information is considered in determining an aggregate rating, each trust score for each of the one or more evaluators based on factors associated with the respective evaluator,
      wherein each trust score for each of the one or more evaluators is based on a rating deviation of the respective evaluator, wherein the rating deviation is based on a comparison of (i) rating information for one or more documents received from the respective evaluator and (ii) rating information for the one or more documents received from one or more other evaluators;
   identifying, at the server, a sensitivity score, the sensitivity score indicating a level of conservatism in determining the aggregate rating, wherein a first level sensitivity indicates a higher degree of conservatism in determining the aggregate rating;
   determining, at the server, the aggregate rating for the document based on the rating information associated with contents of the document from the one or more evaluators, each trust score for each of the one or more evaluators, and the sensitivity score;
   receiving a request from a recipient;
   identifying, at the server, a suitability profile associated with the recipient, where the suitability profile determines whether any information relating to preferences of the recipient are stored in a suitability database, and is used to select the document appropriate for the recipient; and
   determining whether to deliver the document in response to the request for the document based on the suitability profile of the recipient, and the aggregate rating of the document,
      wherein determining whether to deliver the document further comprises determining whether to deliver the document based on whether the aggregate rating satisfies the suitability profile of the recipient; and
      delivering the document to the recipient if the aggregate rating satisfies the suitability profile of the recipient.

2. The method of claim 1, wherein each trust score for each of the one or more evaluators is based on a geographical location of the respective evaluator.

3. The method of claim 1, wherein each trust score for each of the one or more evaluators is based on one or more prior content ratings received from the respective evaluator.

4. The method of claim 1, wherein each trust score for each of the one or more evaluators is based on an industry associated with the respective evaluator.

5. The method of claim 1, wherein each trust score for each of the one or more evaluators is based on a rating deviation of the respective evaluator, wherein the rating deviation is based on a comparison of (i) rating information for one or more documents received from the evaluator and (ii) aggregate ratings for the one or more documents.

6. The method of claim 1, wherein each trust score for each of the one or more evaluators is based on rating information previously received from the respective evaluator for one or more documents.

7. The method of claim 1, further comprising:
   determining one or more revised trust scores for one or more of the one or more evaluators; and
   determining a revised aggregate rating based on the one or more revised trust scores.

8. The method of claim 1, wherein the document is an advertisement.

9. The method of claim 1, wherein the document comprises at least one of a web page, content that can be used in a web page, or a program.

10. The method of claim 1, wherein the one or more evaluators are selected using a random selection algorithm.

11. The method of claim 1, further comprising: receiving new rating information for the document; and processing the new rating information to determine a revised rating associated with the document.

12. The method of claim 1, wherein the aggregate rating comprises one or more subject ratings, each associated with an evaluation criterion.

13. The method of claim 12, wherein the evaluation criterion comprises at least one of sexual content, violent content, adult content, or targeted age.

14. The method of claim 1, wherein the aggregate rating comprises a quantity.

15. The method of claim 1, wherein the aggregate rating comprises a mean of the rating information.

16. The method of claim 1, wherein the aggregate rating comprises a mode of the rating information.

17. The method of claim 1, wherein the aggregate rating comprises a median of the rating information.

18. A system comprising:
   a server including a central processor;
   means for receiving, at the server, rating information associated with contents of a document from one or more evaluators;
   means for identifying, at the server, a trust score for each of the one or more evaluators, each trust score for each of the one or more evaluators being a measure of an extent to which a respective evaluator's rating information is considered in determining an aggregate rating, each trust score for each of the one or more evaluators based on factors associated with the respective evaluator,
      wherein each trust score for each of the one or more evaluators is based on a rating deviation of the respective evaluator, wherein the rating deviation is based on a comparison of (i) rating information for one or more documents received from the respective evaluator and (ii) rating information for the one or more documents received from one or more other evaluators;

means for identifying, at the server, a sensitivity score, the sensitivity score indicating a level of conservatism in determining the aggregate rating, wherein a first level sensitivity indicates a higher degree of conservatism in determining the aggregate rating;

means for determining, at the server, the aggregate rating for the document based on the rating information associated with contents of the document, each trust score, for each of the one or more evaluators and the sensitivity score;

means for receiving a request from a recipient;

means for identifying, at the server, a suitability profile associated with the recipient, where the suitability profile determines whether any information relating to preferences of the recipient are stored in a suitability database, and is used to select the document appropriate for the recipient; and means for determining whether to deliver the document in response to the request for the document based on the suitability profile of the recipient, and the aggregate rating of the document, wherein the means for determining whether to deliver the document further comprises determining whether to deliver the document based on whether the aggregate rating satisfies the suitability profile of the recipient; and delivering the document to the recipient if the aggregate rating satisfies the suitability profile of the recipient.

* * * * *

UNITED STATES PATENT AND TRADEMARK OFFICE
CERTIFICATE OF CORRECTION

| | | |
|---|---|---|
| PATENT NO. | : 7,533,090 B2 | Page 1 of 1 |
| APPLICATION NO. | : 10/812417 | |
| DATED | : May 12, 2009 | |
| INVENTOR(S) | : Sumit Agarwal et al. | |

It is certified that error appears in the above-identified patent and that said Letters Patent is hereby corrected as shown below:

Title Page,

(*) Notice: Subject to any disclaimer, the term of this patent is extended or adjusted under 35 U.S.C. 154(b) by 410 days.

should read (*) Notice: Subject to any disclaimer, the term of this patent is extended or adjusted under 35 U.S.C. 154(b) by 602 days.

Signed and Sealed this

Thirtieth Day of March, 2010

David J. Kappos
*Director of the United States Patent and Trademark Office*